UNITED STATES PATENT OFFICE.

ASAHEL WHEELER, OF NEWTON, MASSACHUSETTS.

IMPROVED COPAL VARNISH.

Specification forming part of Letters Patent No. 36,874, dated November 4, 1862.

*To all whom it may concern:*

Be it known that I, ASAHEL WHEELER, of Newton, in the county of Middlesex and State of Massachusetts, have invented or discovered a new and useful Composition or Varnish; and I do hereby declare the same to be described as follows.

It is well known to varnish-makers that there are several kinds of gum-copal which, owing to the difficulty of making them into a good drying varnish, become of little use and value. In common with others, I have attempted to find some solvent of these and others of the copals which would enable them, when converted into and applied as a varnish, to dry to advantage without becoming tacky or sticky.

The composition constituting my improved copal varnish, with the proportions of the ingredients thereof, may be thus stated. I would remark, however, that these proportions may be somewhat varied.

Composition: one-fifth of a wine-gallon of fusel-oil; four-fifths of a wine-gallon of alcohol, (ninety-five per cent.;) two and a half pounds of gum-copal.

Put the fusel-oil and alcohol together and pour the same on the copal when in a pulverized state, and while in a barrel or vessel capable of being made tight and of being revolved. An ordinary cask or barrel will suffice, provided it be supported by a shaft and other appliances by which it may be put in revolution. The said vessel, after the mixture has been put into it, should be revolved for about ten hours, after which the copal will be found to be dissolved in the liquids, so as to convert it and them into a varnish.

With respect to the copal known as "kauri," or Australian and New Zealand copal, and some other kinds of the softer copal, they need only be reduced to a state of coarse powder in order to prepare them for being dissolved in the fusel-oil and alcohol; but with respect to the other or harder kinds of copal—such as the Angola and Zinzibar copals—they require to be reduced much finer, and sometimes to an impalpable powder or dust, to prepare them for being dissolved by the means above described.

I find this varnish to be better in many respects than that made of alcohol, copal, and spirits of turpentine, a patent on which was granted to Liveras Hull and myself on November 22, 1859.

The advantages of my improved varnish over the said patented varnish are that the former, when dry, becomes much harder. It forms for reception of other varnishes a bed or layer that will not soften like the patented varnish. It has been found that when the patented varnish has been applied to piano-fortes and made to receive a layer of other varnish a softening or liquefying of the former is liable to take place, whereby it is apt to combine with and work through its layer of other varnish. Now, my improved varnish will not so operate with other varnishes, but retain its hardness while they are applied or being applied to it.

My varnish has not the disagreeable odor of (and besides is not so deleterious to health as) the varnish made with turpentine. It holds to wood or any article firmer than the patented varnish, and is not so liable to crack under variation of temperature. Besides, it is a better varnish for paper and many other matters.

I do not claim as my invention a varnish made of copal, alcohol, and spirits of turpentine; but

I claim—

As a new or improved varnish, the composition of copal, alcohol, and fusel-oil, combined substantially in the proportions and manner as hereinbefore set forth.

ASAHEL WHEELER.

Witnesses:
R. H. EDDY,
F. P. HALE, Jr.